(12) United States Patent
Ali et al.

(10) Patent No.: US 7,317,577 B2
(45) Date of Patent: Jan. 8, 2008

(54) METHODS FOR PRODUCING A BLACK MATRIX ON A LENTICULAR LENS

(75) Inventors: M. Zaki Ali, Mendota Heights, MN (US); David E. Brown, St. Paul, MN (US); Elsie A. Fohrenkamm, St. Paul, MN (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/846,906

(22) Filed: May 14, 2004

(65) Prior Publication Data

US 2005/0254132 A1     Nov. 17, 2005

(51) Int. Cl.
    *G02B 27/10*     (2006.01)
(52) U.S. Cl. ...................... 359/619; 359/623
(58) Field of Classification Search ........... 359/619, 359/620, 623; 438/54, 57; 264/1.32
    See application file for complete search history.

(56) References Cited

U.S. PATENT DOCUMENTS

| 4,172,219 | A |   | 10/1979 | Deml et al. |
| 4,647,519 | A |   | 3/1987  | Speigel |
| 4,666,248 | A |   | 5/1987  | van de Ven |
| 4,876,235 | A |   | 10/1989 | DeBoer |
| 5,216,534 | A |   | 6/1993  | Boardman et al. |
| 5,238,778 | A |   | 8/1993  | Hirai et al. |
| 5,278,023 | A |   | 1/1994  | Bills et al. |
| 5,380,644 | A |   | 1/1995  | Yonkoski et al. |
| 5,461,775 | A | * | 10/1995 | Tanabe et al. ............... 29/840 |
| 5,468,591 | A |   | 11/1995 | Pearce et al. |
| 5,575,016 | A |   | 11/1996 | Bailey |
| 5,576,144 | A | * | 11/1996 | Pearce et al. .......... 430/270.15 |
| 5,710,097 | A | * | 1/1998  | Staral et al. ............... 503/227 |
| 5,819,661 | A |   | 10/1998 | Lewis et al. |
| 5,870,224 | A |   | 2/1999  | Saitoh et al. |
| 5,919,600 | A |   | 7/1999  | Huang et al. |
| 5,935,758 | A |   | 8/1999  | Patel et al. |
| 6,001,530 | A |   | 12/1999 | Kidnie et al. |
| 6,027,849 | A |   | 2/2000  | Vogel |
| 6,369,844 | B1 |  | 4/2002  | Neumann et al. |
| 6,461,775 | B1 | * | 10/2002 | Pokorny et al. ............... 430/7 |
| 6,521,390 | B1 |  | 2/2003  | Leinenbach et al. |
| 6,664,020 | B1 |  | 12/2003 | Warner et al. |

(Continued)

FOREIGN PATENT DOCUMENTS

EP     0 602 893     6/1994

(Continued)

*Primary Examiner*—Alicia M Harrington

(57) ABSTRACT

An opaque matrix that defines transparent apertures may be formed on a lenticular lens by applying an infrared radiation sensitive material to the flat surface of the lenticular lens, projecting infrared radiation through the lenticular lens onto the infrared radiation sensitive material to create exposed and unexposed areas of the infrared radiation sensitive material, and removing the exposed areas of the infrared radiation sensitive material from the flat surface of the lenticular lens. The infrared radiation sensitive material includes an infrared absorbing dye and a colorant. The infrared radiation sensitive material may also include a binder. A barrier layer may be disposed between the flat surface of the lenticular lens and the infrared radiation sensitive material. The barrier layer may include a binder, an infrared absorbing dye, and a crosslinking agent. The resulting lenticular lens may be used in a rear projection television screen or monitor.

24 Claims, 2 Drawing Sheets

U.S. PATENT DOCUMENTS

| | | | |
|---|---|---|---|
| 6,781,733 B1 * | 8/2004 | Hira | 359/237 |
| 6,967,779 B2 * | 11/2005 | Fadel et al. | 359/619 |
| 2002/0177082 A1 | 11/2002 | Brady et al. | |
| 2003/0129549 A1 | 7/2003 | Miyata et al. | |
| 2003/0202244 A1 | 10/2003 | Brady et al. | |

FOREIGN PATENT DOCUMENTS

| | | |
|---|---|---|
| EP | 0 739 748 | 10/1996 |
| EP | 1014 169 A1 | 6/2000 |
| EP | 1 275 497 A2 | 1/2003 |
| JP | 2002-182309 | 6/2002 |
| WO | WO 90/12342 | 10/1990 |
| WO | WO 94/04368 | 3/1994 |

* cited by examiner

METHODS FOR PRODUCING A BLACK MATRIX ON A LENTICULAR LENS

BACKGROUND OF THE INVENTION

In rear projection televisions, high definition televisions and monitors, an image is projected from a light source, such as a liquid crystal display (LCD) or digital micromirror device (DMD), onto a transparent screen which typically utilizes a lenticular lens. The lenticular lens is a sheet or film having an array of lenticulae, or micro-lenses, on one side of the sheet. Generally, the opposite side of the sheet is substantially flat. The side of the lenticular lens faces the viewer and focuses the light projected from the light source so that the viewer sees an image on the lenticular lens. In televisions or monitors utilizing a lenticular lens, ambient light from the rear projected light source may reflect off of structures inside the television or monitor and become redirected toward the lenticular lens. This redirected light reduces the quality of the image because the redirected light may appear in places where the projected image should appear black. To achieve high contrast between the colored portion of the image and the black portion of the image, and to prevent the appearance of a Moiré pattern on the lenticular lens and the image, lenticular lenses used in rear projection televisions and monitors have typically included an opaque matrix, or aperture mask, designed to prevent ambient light from entering the projection television.

An opaque matrix may be prepared by printing an opaque, typically black, material on the flat surface of a lenticular lens in the areas corresponding to the areas of the lens where light from the rear light source is not focused by the array of lenticulae, and leaving transparent the areas where light will be focused by the array of lenticulae and viewed as an image. The transparent areas, known as apertures, are framed by the black material. One method of creating the aperture mask on the lenticular lens involves producing the opaque matrix first and then using that matrix to produce the lenticulae on the lenticular lens. Another method involves first preparing the lenticular lens and then using those lenticulae to produce the opaque matrix. The goal of these techniques is to ensure that the apertures of the matrix correspond to the locations where light will be focused by the lenticulae. The present invention relates to the second technique.

Other known methods have been used to create opaque matrices and transparent apertures on lenticular lenses. In one known method, an ultraviolet sensitive material is used to formulate an opaque matrix by exposing the material to ultraviolet radiation. Examples of this type of method can be found in U.S. Pat. No. 4,647,519 to Speigel, U.S. Pat. No. 4,666,248 to van de Ven and U.S. Pat. No. 5,870,224 to Saitoh, et al. In another known technique, a silver halide photographic light-sensitive material is used to create an opaque matrix by exposing silver halide photographic light-sensitive material to light. An example of this method is found in U.S. patent Publication No. 2003/0129,549 to Miyata, et al. In still another known technique, a thermally sensitive opaque material can create black stripes by exposing the thermally sensitive opaque material to a focused laser and heat. Examples of these methods can be found in U.S. Pat. No. 4,172,219 to Deml et al. and Japanese Patent Application No. 2000-378,258 to Watanabe, et al.

SUMMARY

The invention is an opaque matrix containing an infrared absorbing dye and a colorant on a lenticular lens and is a method of forming an opaque matrix on a lenticular lens by applying an infrared radiation sensitive material to the flat surface of the lenticular lens, projecting infrared radiation through the lenticular lens onto the infrared radiation sensitive material to create exposed and unexposed areas of the infrared radiation sensitive material, and removing the exposed areas of the infrared radiation sensitive material from the flat surface of the lenticular lens. The infrared radiation sensitive material contains an infrared absorbing dye that photoexcites upon exposure to infrared radiation and a colorant that absorbs visible light. In the practice of this invention, the exposed areas of the infrared radiation sensitive material are removed from the lenticular lens to produce an opaque matrix that defines apertures on the flat surface of the lenticular lens.

In particular embodiments, a barrier layer is disposed between the flat surface of the lenticular lens and the infrared radiation sensitive material. The barrier layer may include an infrared absorbing dye, an ablatable polymer and a latent crosslinking agent. Suitable barrier layers will be clear and substantially free of colorant. The barrier layer may assist in removing the exposed areas of the infrared radiation sensitive material resulting in apertures that are more transparent and an opaque matrix with sharper edge resolution.

In another embodiment, the invention is directed to a lenticular lens sheet with an opaque matrix formed on the flat surface of the lenticular lens sheet. The opaque matrix in this embodiment contains an infrared absorbing dye and a colorant. In some embodiments, the opaque matrix also contains a binder. A barrier layer may also be disposed between the flat surface of the lenticular lens and the opaque matrix.

Infrared radiation sensitive materials also produce opaque matrices that exhibit greater opacity, sharper edge resolution and more transparent apertures than opaque materials that are not sensitive to infrared radiation. Opacity in the opaque matrix and transparency in the apertures produces a high contrast image when the lenticular lens is used in a rear projection television screen or monitor. Sharp edge resolution is sought because variations in the amount of light blocked by the opaque matrix may cause distortions of the image seen on the lenticular lens.

DETAILED DESCRIPTION

Figure 1:
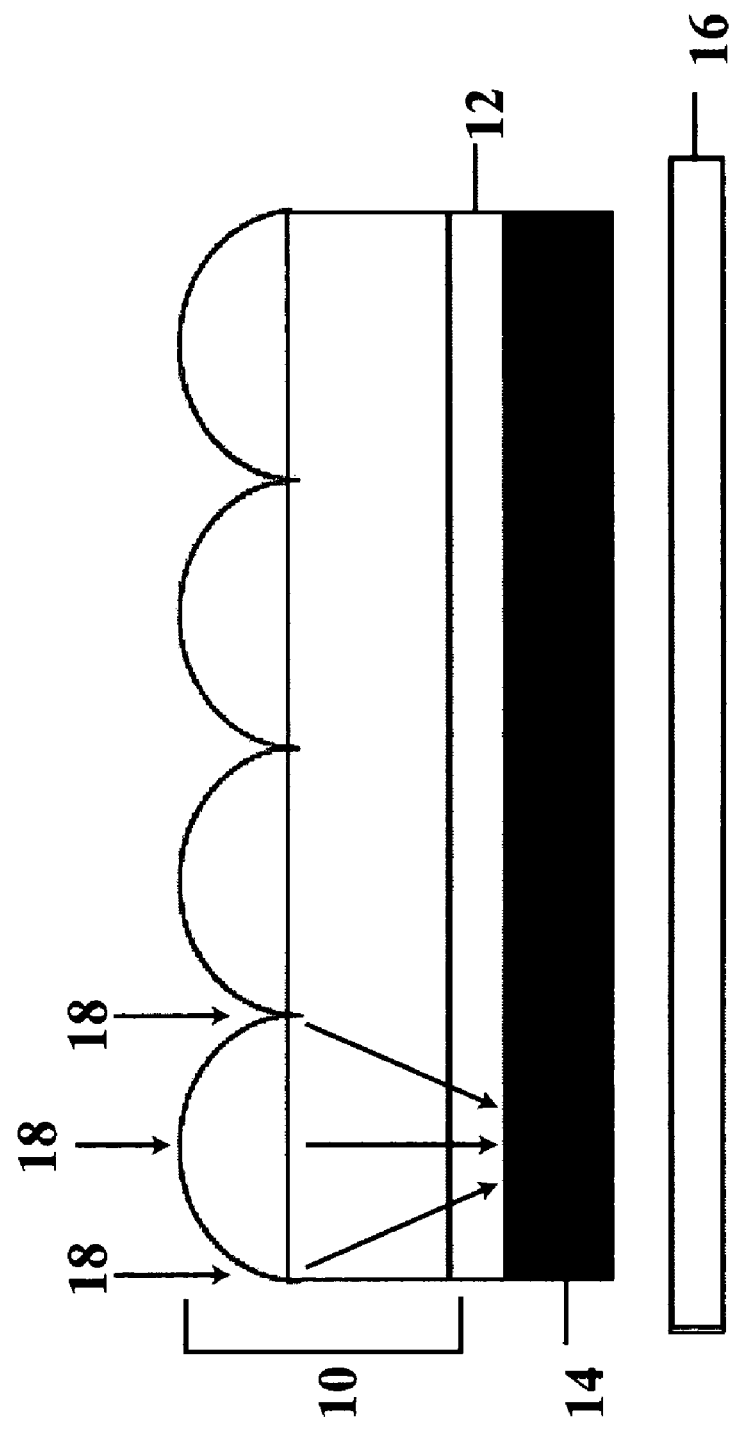
FIG. 1 illustrates a side view of a lenticular lens 10 coated with a barrier layer 12 and an infrared radiation sensitive material 14 on the flat surface of the lenticular lens 10. The arrows illustrate infrared radiation 18 projected through and focused by the micro-lenses on the lenticular lens 10. Also illustrated is a receptor sheet 16 in close proximity to the infrared radiation sensitive material 14.
Figure 2:
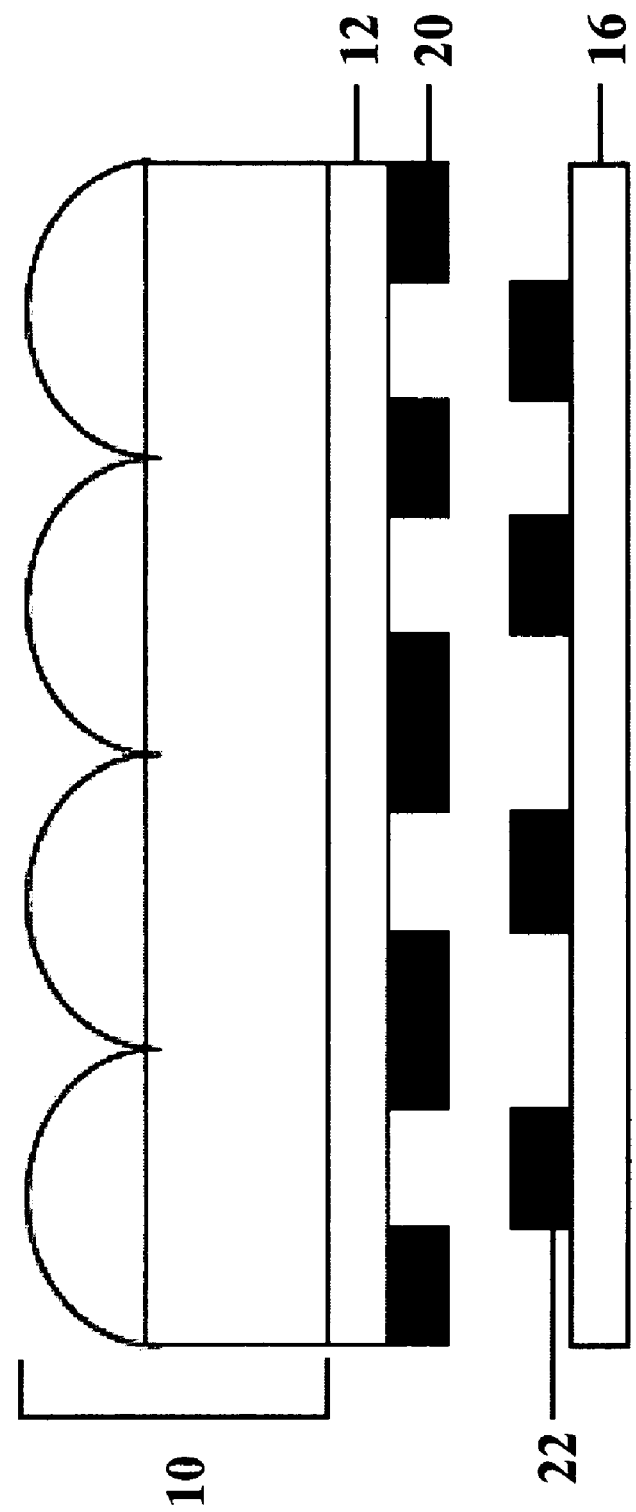
FIG. 2 illustrates the side view of the lenticular lens 10 of FIG. 1 after the exposed areas 22 of the infrared radiation sensitive material have been removed from the flat surface of the lenticular lens 10, leaving an opaque matrix 20 on the flat surface of the lenticular lens 10.

The invention is a method of forming an opaque matrix on the flat surface of a lenticular lens so that the opaque matrix may block unwanted ambient light from appearing on the lenticular lens. The opaque matrix is formed by applying an infrared radiation sensitive material that includes an infrared absorbing dye and a colorant to the flat surface of a lenticular lens, projecting infrared radiation through the lenticular lens and removing the exposed areas of the infrared radiation sensitive material. The invention also encompasses the lenticular lens sheet with an opaque matrix formed on the flat surface of the lenticular lens sheet in which the opaque matrix contains an infrared absorbing dye and a colorant.

Applying an Infrared Radiation Sensitive Material to a Lenticular Lens

Lenticular Lens

In one step of the method, an infrared radiation sensitive material is applied to the flat surface of a lenticular lens. The term "lenticular lens" refers to a sheet or film having an array of lenticulae, or micro-lenses, on one side of the sheet that focus light onto a focal plane. Generally, the opposite side of the sheet is substantially flat.

Suitable lenticular lenses for use in a rear projection television or monitor contain an array of lenticulae. The lenticulae may be cylindrical or spherical in shape.

The lens pitch may vary depending on the intended use of the lenticular lens. The term "lens pitch" refers to the distance between the foci of adjacent lenses. For rear projection television and monitor screens, the lens pitch is 1.0 mm or less, more particularly 0.3 mm or less, and may even be 0.15 mm or less.

The lenticular lens may also be described by the radius of each micro-lens. The radius of each micro-lens may be, for example, about 0.09 mm.

The lenticular lens may be comprised of various materials known in the art, such as, for example, polymeric materials. Suitable polymeric materials include, for example, polycarbonate, polyethylene terephthalate, polymath methacrylate, and methyl methacrylate-styrene copolymer resin. In certain embodiments, the lenticular lens may be formed in one piece. For example, the polymeric material may be molded or cast into the lenticular lens. In other embodiments the lenticulae are formed and then attached to a transparent substrate. In this embodiment, the substrate and the lenticulae may contain different materials.

Infrared Radiation Sensitive Material

The infrared radiation sensitive material includes an infrared absorbing dye and a colorant (e.g., a dye or pigment) dispersed. In many embodiments, the an infrared absorbing dye and a colorant are dispersed in a binder. However, binder-free infrared radiation sensitive materials are also possible, as reported in International Publication WO 94/04368.

The infrared radiation sensitive material is generally disposed on the flat surface of the lenticular lens as a relatively uniform coating (i.e., substantially continuous and having a fairly uniform thickness). In some embodiments, the infrared radiation sensitive material resides on the lenticular lens as a single layer. In other embodiments, the infrared radiation sensitive material may comprise more than one layer, depending on the chosen mechanism for removing the exposed areas of the infrared radiation sensitive material. For example, the infrared radiation sensitive material may include a light-to-heat converting layer, and a layer comprising ablative or sublimable material. Preferably, the components of the infrared radiation sensitive material are chosen such that the infrared radiation sensitive material is removable from the lenticular lens after exposure to infrared radiation by one of several mechanisms, described below.

Infrared Absorbing Dye

The infrared radiation sensitive material includes an infrared absorbing dye. Absorption of infrared radiation by the infrared absorbing dye creates heat which initiates a physical or chemical change in the other components of the infrared radiation sensitive materials. This may result in a transfer of the infrared radiation sensitive material off of the flat surface of the lenticular lens. Examples of suitable infrared absorbing dyes include cyanide infrared absorbing dyes and infrared absorbing pigments such as carbon black.

In some embodiments, the infrared absorbing dye is a cationic dye. Suitable cationic dyes for use in the infrared radiation sensitive material include tetraarylpolymethine (TAPM) dyes, amine cation radical dyes, and mixtures thereof. Particularly suitable infrared absorbing dyes in the present invention are tetraarylpolymethine dyes. Dyes of these classes are typically stable when formulated with the other components of the infrared radiation sensitive material, and absorb in the correct wavelength ranges for use with the commonly available laser sources. Furthermore, dyes of these classes are believed to react with a latent crosslinking agent, described below, when exposed to infrared radiation.

TAPM dyes comprise a polymethine chain having an odd number of carbon atoms (5 or more), each terminal carbon atom of the chain being linked to two aryl substituents. TAPM dyes generally absorb in the 700 nm-900 nm region, making them suitable for diode laser address. Suitable TAPM dyes are described, for example, in U.S. Pat. No. 5,935,758 to Patel, et al.

Suitable cationic infrared absorbing dyes include the class of amine cation radical dyes reported, for example, in International Publication WO 90/12342, and in EP publication 0 739 748. Suitable cationic infrared absorbing dyes are also described in U.S. Pat. No. 5,935,758 to Patel, et al.

The infrared absorbing dye may be present in a sufficient quantity to provide a transmission optical density of at least about 0.5, more particularly, at least about 0.75, and most particularly, at least about 1.0, at the exposing wavelength. Typically, this is achieved with about 3 wt.-% to about 20 wt.-% infrared absorbing dye, based on the solids content of the infrared radiation sensitive material.

Colorant

The infrared radiation sensitive material also includes a colorant. The colorant will be present in the resulting opaque matrix, and will be capable of providing strong absorbance of visible light, or is otherwise capable of blocking the visible light, such as by reflectance. As used herein, the term "colorant" indicates a component that substantially prevents the transmission of visible light when the lenticular lens is used in a rear projection screen.

The colorant generally comprises one or more dyes or pigments that will provide the desired spectral properties. The colorant is preferably present in the infrared radiation sensitive material in an amount of about 10 wt.-% to about 50 wt.-%, based on the solids content of the infrared radiation sensitive material.

The colorant can be a particulate material that is of sufficiently small particle size to be dispersed within the infrared radiation sensitive material, with or without the aid of a dispersant. Suitable colorants for use in the infrared radiation sensitive material include pigments, nonsublimable dyes, or sublimable dyes. Pigments and nonsublimable dyes are suitably employed because they do not tend to migrate. The use of pigment dispersions in imaging is well-known in the art, and any conventional pigments useful for that purpose may be used in the present invention.

In one embodiment of the invention, the colorant is a black dye or pigment. A suitable black dye or pigment absorbs energy at substantially all wavelengths across the visible spectrum, for example, between about 350 nm and about 750 nm. However, the black dye or pigment may, for example, also absorb in the infrared or ultraviolet region as well. Suitable black dyes or pigments may also include dyes and pigments that absorb different wavelengths within the visible spectrum. These dyes or pigments may, for example, actually be a deep blue or other color. The black dye or pigment may include mixtures of dyes or pigments, or mixtures of both dyes and pigments, that individually may or may not be black but when mixed together provide a neutral black color. For example, a mixture of NEPTUN Black, Blue Shade Magenta, and Red Shade Yellow Pigment, available from BASF (Germany), which provide a neutral black color, may be suitable. DISPERCEL CBJ from Runnemade Dispersions KV (United Kingdom) may also be suitable as the colorant.

One suitable black pigment is carbon black. Carbon black exhibits neutral color and suitable covering power. It may be desirable to use a carbon black having small particles for maximum opacity. Fine-grained carbon black brands with a mean particle size below 30 nm are especially suitable. Examples of suitable carbon black pigments include RAVEN 450, 760 ULTRA, 890, 1020, 1250, and others available from Colombian Chemicals Co. (Atlanta, Ga.), as well as BLACK PEARLS 170, BLACK PEARLS 480, VULCAN XC72, BLACK PEARLS 1100, and others available from Cabot Corp. (Waltham, Mass.). Other suitable carbon blacks include PRINTEX U, PRINTEX L6, SPEZIALSCHWARZ 4 OR SPEZIALSCHWARZ 250 of Degussa (Germany). The carbon black may comprise, for example, about 10 wt.-% to about 50 wt.-%, more particularly about 10 wt.-% to about 40 wt.-%, and even more particularly about 10 wt.-% to about 30 wt.-% of the total weight of the infrared radiation sensitive material.

Infrared radiation sensitive materials containing only carbon black are difficult to formulate due to inherent absorption of infrared radiation by the carbon black particles. Overheating of the carbon black within the infrared radiation sensitive material may result in loss of density or increased diffusion of the infrared radiation sensitive material. Diffusion of the infrared radiation sensitive material may cause poor edge sharpness of the opaque matrix. Incorporating one or more non-infrared absorbing black dyes or pigments in combination with carbon black, into the opaque radiation sensitive material reduces the interference with the radiation and improves the sharpness of the edge resolution in the opaque matrix that results. Even though the concentration of carbon black is reduced significantly, suitable color neutrality and opacity is maintained.

Also suitable as a pigment is a non-carbonaceous particulate material such as metal particles or metal oxide particles.

In another embodiment of the invention, the colorant may be a non-infrared absorbing black dye or pigment. Non-infrared absorbing black dyes or pigments include dyes or pigments that absorb minimal or no amount of infrared radiation. The non-infrared absorbing colorant may absorb some infrared radiation in this embodiment, as long as there is little or no interference with the infrared absorbing dye. For example, non-infrared absorbing black dyes or pigments may absorb less than about 0.5 absorbance unit, more particularly, less than about 0.1 absorbance unit of infrared radiation, at concentrations of the non-infrared absorbing black dye or pigment that are used in the infrared radiation sensitive material.

Non-infrared absorbing black dyes and pigments include, for example, NEPTUN Black X60, PALIOGEN Black S 0084, available from BASF (Germany), as well as MICROLITH Violet B-K, available from Ciba Specialty Chemicals (Tarrytown, N.Y.). Other suitable non-infrared absorbing black dyes may be found in U.S. Pat. No. 6,001,530 to Kidnie, et al. which is incorporated herein by reference in its entirety.

Binder

The infrared radiation sensitive material may also include a binder. Suitable binders are capable of dissolving or dispersing the other components included in the infrared radiation sensitive material. The binder may serve several purposes depending on the mechanism used for removing the exposed areas of the infrared radiation sensitive material. One function of the binder is to aid in the removal of the exposed areas of the infrared radiation sensitive material from the flat surface of the lenticular lens. A binder that provides adhesion to the flat surface of the lenticular lens may also be helpful.

The total binder is typically present in an amount of about 25 wt.-% to about 75 wt.-%, and more suitably in an amount of about 35 wt.-% to about 65 wt.-%, based on the solids content of the infrared radiation sensitive material.

A wide variety of binders may be suitable in the practice of the invention. The binder should be compatible with the other selected components of the infrared radiation sensitive material, and should be soluble in a suitable coating solvent such as lower alcohols, ketones, ethers, hydrocarbons, haloalkanes and the like.

For example, the binder may be a polymeric material that contains a plurality of hydroxy groups (i.e., a "hydroxylic polymer"). In one embodiment, 100% of the binder is a hydroxylic polymer. The hydroxy groups may be alcoholic groups or phenolic groups, or both. Binders containing predominantly alcoholic groups are suitable. A hydroxylic polymer may be obtained by polymerization or copolymerization of hydroxy-functional monomers such as allyl alcohol and hydroxyalkyl acrylates or methacrylates, or by chemical conversion of preformed polymers, e.g., by hydrolysis of polymers and copolymers of vinyl esters such as vinyl acetate. Polymers with a high degree of hydroxy functionality, such as poly(vinyl alcohol), cellulose, etc., are also suitable for use in the invention. Derivatives of such polymers, obtained by esterification, etherification, or acetalization of the bulk of the hydroxy groups, generally exhibit superior solubility and film-forming properties, and provided that at least a minor proportion of the hydroxy groups remain unreacted, they are suitable for use in the invention.

One suitable hydroxy-functional polymer for use as the binder is a reaction product formed by reacting poly(vinyl alcohol) with butyraldehyde. Commercial grades of this reaction product typically leave at least 5% of the hydroxy groups unreacted (i.e., free), and are generally in common organic solvents and possess excellent film-forming and pigment-dispersing properties.

A commercially available hydroxylic polymer that is suitable is a polyvinyl butyral polymer available under the trade designation BUTVAR B-76 from Solutia, Inc. (St. Louis, Mo.). This particular polymer has a softening range of about 140° C. to about 200° C. Other hydroxylic binders from the BUTVAR series of polymers may also be used. Polyvinyl butyral polymers available under the trade designations MOWITAL from Kuraray America, Inc. (New York, N.Y.) are also suitable.

Alternatively, a blend of one or more non-crosslinkable binders with one or more hydroxy-functional binders may be used. A non-crosslinkable binder should be compatible with the removal mechanism of the present invention. That is, it should be nonreactive when exposed to the conditions used during exposure to infrared radiation. Suitable non-crosslinkable binders include, for example, polyesters, polyamides, polycarbamates, polyolefins, polystyrenes, polyethers, polyvinyl ethers, polyvinyl esters, polyacrylates, polymethacrylates, and the like. An example of a suitable commercially available non-crosslinkable binder that can be combined with the hydroxylic binders described above in the infrared radiation sensitive material includes poly(methyl methacrylate) available under the trade designation ELVACITE from DuPont (Wilmington, Del.).

In a particular embodiment, the binder may include nitrocellulose. Nitrocellulose may particularly be useful if the infrared radiation sensitive material is removed through ablation.

Bleaching Agent

In one embodiment of the invention, the opaque infrared radiation sensitive material further includes a bleaching agent. Suitable thermal bleaching agents include, for example, guanidine derivatives, amine salts of arylsulphonylacetates and quaternary ammonium nitrophenyl-sulphonylacetates. A suitable bleaching agent may be selected, for example, based on its ability to bleach the particular infrared absorbing dye used in the infrared radiation sensitive material. For example, photoacid generators may be useful to bleach specific near-infrared absorbers. Dihydropyridine derivative are suitable bleaching agents for use with TAPM dyes. If present, the bleaching agent suitably comprises about 2 wt.-% to about 25 wt.-% of the solids in the infrared radiation sensitive material, more particularly about 5 wt.-% to about 20 wt.-%. However, the amount of bleaching agent employed, if present, may vary depending on the concentration and characteristics of the infrared absorbing dye used.

Fluorocarbon Additive

The infrared radiation sensitive material may optionally include a fluorocarbon additive for enhancing transfer of a molten or softened infrared radiation sensitive material and production of an opaque matrix having well-defined, generally continuous, and relatively sharp edges. Under exposure conditions, it is believed that the fluorocarbon additive serves to reduce cohesive forces within the infrared radiation sensitive material at the interface between the laser-exposed heated areas and the unexposed areas, and thereby promotes clean "shearing" of the exposed areas in the direction perpendicular to the major surface of the infrared radiation sensitive material. This provides sharper edge resolution of the opaque matrix as there is less tendency for "tearing" or other distortions as the exposed areas separate from the rest of the infrared radiation sensitive material.

A wide variety of compounds may be employed as the fluorocarbon additive, provided that the chosen additive is substantially involatile under normal coating and drying conditions, and is sufficiently compatible with the binder(s). Thus, highly insoluble fluorocarbons, such as polytetrafluoroethylene and polyvinylidenefluoride, are unsuitable, as are gases and low boiling liquids, such as perfluoralkanes. With the above restrictions, both polymeric and lower molecular weight materials may be used.

Examples of suitable fluorocarbon additives are described in U.S. Pat. No. 5,935,758 to Patel, et al. The infrared radiation sensitive material may also include a fluorocarbon compound as described in U.S. Pat. No. 6,664,020 to Warner, et al. Other suitable fluorocarbon compounds are reported in EP publication 0 602 893 and the references cited therein. A particular fluorocarbon additive is a sulfonamido compound N-ethyl perfluorooctanesulfonamide having the formula $(C_8F_{17})SO_2NH(CH_2CH_3)$, which includes 70% straight chains and 30% branched chains. The fluorocarbon additive is typically used in an amount of about 1 wt.-% to about 10 wt.-%, based on the dry coating weight of the infrared radiation sensitive material. Preferably, the weight ratio of fluorocarbon additive to colorant is at least about 1:10, and more particularly at least about 1:5.

Latent Crosslinking Agent

A latent crosslinking agent is employed in some embodiments. As used herein, a "latent crosslinking agent" is a compound that is capable of causing crosslinking only under conditions of infrared laser address. It is believed that upon exposure to infrared radiation, the latent crosslinking agent reacts with a infrared absorbing dye, which initiates crosslinking of the hydroxylic binder. Thus, crosslinking occurs during infrared radiation.

Suitable latent crosslinking agents include compounds derived from dihydropyridine, for example. Suitable derivatives of dihydropyridine can be substituted at any of the ring positions with appropriate substituents, such as alkyl or aryl groups. In particular, 3,5-dicarboxylic diester derivatives of dihydropyridine are suitable as latent crosslinking agents. Polymers comprising a 3,5-dicarboxylic diester derivative of dihydropyridine integrated into the polymer backbone may also be suitable. Latent crosslinking agents that are useful in the infrared radiation sensitive material are described in U.S. Pat. No. 5,935,758 to Patel, et al.

This latent crosslinking agent is present in the infrared radiation sensitive material in an amount of up to about 30 wt.-%, based on the solids content of the infrared radiation sensitive material. Alternatively, a latent crosslinking agent can be present in a receptor sheet placed in close proximity with the infrared radiation sensitive material prior to exposing the infrared radiation sensitive material to infrared radiation.

The latent crosslinking agent is believed to be important for providing cohesion within the transferred infrared radiation sensitive material. This complements the action of a fluorocarbon additive, and results in transfer of the exposed areas as a coherent film. It is also believed to be important for preventing retransfer of colorant back to the flat surface of the lenticular lens.

Optional Components

Additional components such as, for example, plasticizers, coating aids, dispersing agents, UV absorbers, fillers, etc., may also be incorporated into the infrared radiation sensitive material. The various additives are well-known in the art.

The infrared radiation sensitive material may also contain, for example, a coating aid such as a dispensing agent. Dispersing agents, or "dispersants," may be desirable to achieve optimum dispersion quality. Some examples of dispersing agents include, for example, polyester/polyamine copolymers, alkylarylpolyether alcohols, acrylic binders, and wetting agents. One suitable dispersant in the infrared radiation sensitive material is a block copolymer with pigment-affinic groups, which is available under the trade designation DISPERBYK 161 from Byk-Chemie USA (Wallingford, Conn.). The dispersing agent is preferably used in the dispersion in an amount of about 1 wt.-% to about 6 wt.-%, based on the solids content of the infrared radiation sensitive material.

Surfactants may be used as a coating aid to improve solution stability. A wide variety of surfactants can be used. One suitable surfactant is a fluorocarbon surfactant used in the infrared radiation sensitive material to improve coating quality. Suitable fluorocarbon surfactants include fluorinated polymers, such as the fluorinated polymers described in U.S. Pat. No. 5,380,644 to Yonkoski, et al. An example of a suitable coating aid is a NOVEC fluorosurfactant available from 3M (St. Paul, Minn.), such as FC 4432.

A suitable quantity may be in the range of about 0.05 wt.-%, and less than about 5 wt.-%, and typically is in the range of about 1 to 2 wt.-%.

Barrier Layer

The lenticular lens may also contain a barrier layer disposed between the flat surface of the lenticular lens and the infrared radiation sensitive material that functions to reduce staining of the apertures resulting on the lenticular lens. A barrier layer may be particularly suitable when the transfer step includes an ablative mechanism, for example. The barrier layer may also be resistant to high temperatures. The components used in the barrier layer should be selected such that the barrier layer is not adversely affected (for example, by solvent of the infrared radiation sensitive layer) during the application of the infrared radiation sensitive layer on the barrier layer.

Suitable barrier layers and their preparation are described, for example, in U.S. Pat. Nos. 5,468,591 and 5,576,144 to Pearce, et al., and U.S. Pat. No. 6,369,844 to Neumann, et al. The barrier layer may include a binder, and more particularly, a "heat-combustible" binder. Suitable heat-combustible binders are reported in U.S. Pat. No. 6,521,390 to Leininbach, et al. By way of example only, suitable heat-combustible binders include poly(alkyl cyanoacrylate), hydroxyl propyl cellulose, and nitrocellulose. Propellant-generating polymers, such as glycidyl azide polymer ("GAP"), and other azido group-containing polymers are described in U.S. Pat. No. 5,278,023 to Bills, et al. and U.S. Pat. No. 6,027,849 to Vogel. Hydropililc polymers, such as, for example, polyvinyl alcohol, methyl cellulose, hydroxypropyl methyl cellulose, hydroxypropyl methyl cellulose, and gelatin, may also be used as binders.

The barrier layer may also include an infrared absorbing dye, including those described above. Particularly suitable infrared absorbing dyes for the barrier layer are cationic infrared absorbing dyes reported in U.S. Pat. No. 5,935,758 and TAPM dyes, described above.

The barrier layer may also comprise a crosslinking agent. The use of a crosslinking agent may impart greater thermal resistance to the barrier layer. Exemplary crosslinking agents include melamine-formaldehyde resins, such as RESIMENE from UCB Group (Belgium), dialdehydes such as glyoxal, phenolics such as DURITE from Borden Chemical Inc. (Columbus, Ohio), polyfunctional aziridines, isocyanates such as DESMODUR AP from Bayer Corp. (Pittsburgh, Pa.), urea-formaldehyde, epoxies such as EPON 1001 from Shell Chemical (Houston, Tex.). Other suitable crosslinking agents include acid catalysts and thermal acid generators. Many other suitable crosslinking agents are known in the art.

Application of the Infrared Radiation Sensitive Material to the Lenticular Lens

The infrared radiation sensitive material may be applied to the flat surface of the lenticular lens or to the barrier layer, if present, using any suitable technique. For example, the components used in the infrared radiation sensitive material described above may be dissolved in a suitable solvent to create a solution of infrared radiation sensitive material that is coated onto the lenticular lens. Suitable solvents include, for example, methyl ethyl ketone, propylene glycol methyl ether, ethanol, and other alcohols, or blends of these solvents. Suitable methods of coating the solution onto the flat surface of the lenticular lens include, for example, spin coating, bar coating, gravure coating and roller coating. Once the solution of infrared radiation sensitive material is applied to the flat surface of the lenticular lens, the solution may be dried or cured to form a film of infrared radiation sensitive material on the lenticular lens. Drying or curing may be performed by heating the lenticular lens and the solution of infrared radiation sensitive material coated on it. For example, the lenticular lens coated with the solution of infrared radiation sensitive material may be placed into a heated oven until a film of the infrared radiation sensitive material forms on the lenticular lens. The solution of infrared radiation sensitive material may also, for example, be allowed to air dry without heating.

In another embodiment, the infrared radiation sensitive material is laminated from a donor sheet coated with the infrared radiation sensitive material to the flat surface of the lenticular lens. In this embodiment, a donor sheet coated with the infrared radiation sensitive material is placed with the infrared radiation sensitive material facing the flat surface of the lenticular lens. The infrared radiation sensitive material is then transferred from the donor sheet to the lenticular lens by applying pressure and heat to the lenticular lens, infrared radiation sensitive material, and donor sheet. In this embodiment, the donor sheet may also contain, for example, one or more release layers that help transfer the infrared radiation sensitive material to the flat surface of the lenticular lens upon exposure to heat and pressure.

If a barrier layer is first disposed on the lenticular lens, the infrared radiation sensitive material may be applied to the barrier layer in the same methods as described above. Suitably, the solvents used to dissolve the infrared radiation sensitive material for application of the infrared radiation sensitive material onto the barrier layer should not dissolve or disperse the components of the barrier layer.

Applying the Barrier Layer to the Lenticular Lens

The barrier layer may be applied to the lenticular lens by, for example, combining the desired components in a solvent, or a mixtures of suitable solvents to form the barrier layer solution. Suitable methods of coating the barrier layer solution onto the flat surface of the lenticular lens include, for example, spin coating, bar coating, gravure coating and roller coating.

Once the barrier layer solution is applied to the flat surface of the lenticular lens, the solution may be, for example, dried or cured to form the barrier layer on the lenticular lens. Drying or curing may be performed, for example, by heating the barrier layer solution. For example, the lenticular lens coated with the barrier layer solution may be placed in a heated oven until the barrier layer forms a film on the lenticular lens. The barrier layer solution may also, for example, be allowed to air dry without heating.

Projecting Radiation Through the Lenticular Lens

To form an opaque matrix from the infrared radiation sensitive material that is properly aligned with the lenticular lens, the invention includes the step of projecting infrared radiation through the lenticular lens onto the infrared radiation sensitive material. The radiation creates very intense, localized heating in the infrared radiation sensitive material where the lenticulae focus the projected radiation. The areas of the infrared radiation sensitive material where the radiation is focused is referred to as the exposed areas.

Methods of projecting radiation through the lenticular lens are conventional in the art. In some embodiments of the invention, exposure is efficiently accomplished using laser radiation from a laser that is flooded, flashed, scanned or rasterized under computer control. For example, a short pulse flashlamp, such as one described in U.S. Pat. No. 5,575,016 to Dunn et al. may be used to expose the lenticular lens to infrared radiation. Furthermore, any of the known scanning devices may be used, e.g., flat-bed scanners, external drum scanners, or internal drum scanners. In any of these devices, the lenticular lens must be positioned so that the lenticulae are oriented between source of the radiation and the infrared radiation sensitive material. In this position, the infrared radiation will be focused by the lenticulae to create exposed areas and unexposed areas of the infrared radiation sensitive material.

The infrared radiation may be, for example, in the range of about 750 nm to about 1200 nm. Infrared radiation may be provided, for example, by an infrared laser such as a diode laser that emits infrared radiation with a wavelength of about 830 nm or a Nd:YAG laser that emits radiation at a wavelength of about 1064 nm. The infrared radiation may also be provided by a short pulse flashlamp. In this step, the infrared absorbing dye may, for example, convert infrared radiation to heat. The generation of heat in the exposed areas of the infrared radiation sensitive material may then result in a physical or chemical change in another component of the infrared radiation sensitive material that makes the infrared radiation sensitive material more removable from the lenticular lens than the infrared radiation sensitive material in the unexposed areas.

Suitable infrared imagers include those infrared imagers used in proofing processes. Examples of such infrared exposure units include DESERTCAT 88, available from ECRM (Tewksbury, Mass.). Infrared imagers for CTP lithographic plate applications, such as the TRENDSETTER 3230, which contains a laser diode that emits near infrared radiation at a wavelength of about 830 nm, from Creo (Burnaby, British Columbia) and DIMENSION from Presstek (Hudson, N.H.) may also be used. Imagers configured for imaging flexographic articles, such as CYREL Digital Imager (CDI SPARK) manufactured by Esko-Graphics (Kennesaw, Ga.), THERMOFLEX by Creo (Burnaby, British Columbia), and OMNISETTER from Misomex International (Hudson, N.H.) could also be employed. Another suitable infrared exposure unit is a Crescent 42T Platesetter, an internal drum platesetter that emits infrared radiation with a wavelength of 1064 nm, available from Gerber Scientific (South Windsor, Conn.).

The exposed areas of the infrared radiation sensitive material should correspond to the areas of the lenticular lens where the visible light projecting an image will pass through lenses during use of the lenticular lens in a rear projection screen. Thus, the radiation should be spatially distributed by the lenses to create exposed areas of suitable width. The width of the exposed areas will vary based upon the lens pitch and radius of the lenticulae on the lenticular lens. Even in similarly configured lenticular lenses, the width of the exposed areas may be varied based upon the focus displacement of the infrared radiation or upon the laser fluence. Focus displacement, or focus shift, refers to the distance of the focal plane produced by a laser focused through the lenticulae (typically given in units of microns) while laser fluence refers to the laser energy per unit area (typically given in units of mJ/cm2). If the laser fluence is held constant, then narrower exposed areas and narrower apertures will result from larger focus displacements. Similarly, if the focus displacement is held constant, the aperture width will increase if the laser fluence is increased.

Removing Exposed Infrared Radiation Sensitive Material from the Lens

Removing the exposed infrared radiation sensitive material results in an opaque matrix that defines transparent apertures on the flat surface of the lenticular lens. As used herein, the term "opaque matrix" refers to the pattern of unexposed infrared radiation sensitive material that is left on the flat side of the lenticular lens after the exposed infrared radiation sensitive material is removed. The opaque matrix functions to block the visible ambient light that is reflected from the interior of a television and prevents distortion of the image that is projected through the apertures on the lenticular lens. Thus, a suitable opaque matrix is sufficiently opaque to block visible light.

The opacity of the opaque matrix is measured in units of transmission optical density. A suitable opaque matrix has a transmission optical density of greater than 2.5, more particularly greater than 3.0. The colorant used in the infrared radiation sensitive material is the substance that imparts opacity to the resulting opaque matrix.

Another quality of a suitable opaque matrix, when the opaque matrix is in the shape of stripes, is edge straightness or edge non-linearity. Edge non-linearity can be defined quantitatively as the percent increase in distance between two points along the edge of a stripe as compared to the distance of a straight line between those two points. To calculate the edge non-linearity of a particular opaque matrix that is a strip, two points along one edge of the stripe are selected and a straight line between the two points is measured. Second, the actual edge of the stripe between the two points is traced and that traced distance is measured. These two numbers are compared so that the increased distance between the two points along the traced edge can be expressed as a percentage increase in distance as compared to the straight line between the two points. Using this method to measure edge straightness, a zero % edge non-linearity corresponds to a perfectly straight edge while a non-linearity of 10%, for example, corresponds to an edge having a great degree of raggedness. A suitable amount of edge non-linearity is 8% or less, more particularly 5% or less.

The step of removing the exposed areas of the infrared radiation sensitive material should result in apertures that are sufficiently transparent to visible light. The quality of transparency may be measured in terms of mean transmittance of the apertures. This amount reflects the amount of visible light that is transmitted through the apertures of the lenticular lens as compared to the amount of visible light that is projected toward the lenticular lens. Suitable methods of creating an opaque matrix will result in apertures exhibiting a mean transmittance of 85% or greater, more particularly 90% or greater.

To form an opaque matrix on the lenticular lens, the areas of the infrared radiation sensitive material exposed to infrared radiation are removed. Various mechanisms may be employed to remove the exposed areas of the infrared radiation sensitive material such as ablation, melt-stick, laser-induced film transfer, or by development. The mechanism used may depend upon the components used in the infrared radiation sensitive material.

Ablation

In one embodiment, the exposed areas of the infrared radiation sensitive material are removed through ablation. In this embodiment, the exposed infrared radiation sensitive material is propelled from the lenticular lens by generation of a gas. Specific binders that decompose upon exposure to heat, such as infrared radiation, to rapidly generate a gas may be used in the infrared radiation sensitive material. The build-up of gas under or within the exposed areas of the infrared radiation sensitive material creates pressure that propels the infrared radiation sensitive material off of the lenticular lens in the exposed areas. This action is distinguishable from other mass transfer techniques in that a chemical change (e.g., bond-breaking), rather than a physical change (e.g., melting, evaporation or sublimation), causes an almost complete transfer of the infrared radiation sensitive material in the exposed areas rather than a partial transfer.

By an ablative mechanism, an opaque matrix may be generated on a lenticular lens using a suitable debris collector, such as, for example, a vacuum or a suitable receptor sheet. The vacuum or receptor sheet may be in close proximity with the infrared radiation sensitive material to retrieve the exposed areas of the infrared radiation sensitive material after it is propelled from the lenticular lens. The phrase "in close proximity" in this context mean that the infrared radiation sensitive material and receptor sheet may be brought into physical contact with each other, or that they may be sufficiently close to allow transfer of infrared radiation sensitive material upon exposure to infrared radiation.

The receptor sheet used may be any material suitable for removing the infrared radiation sensitive material such as, for example, papers, transparent films, and metal sheets. One example of a suitable receptor sheet is a MATCHPRINT DIGITAL HALFTONE RECEPTOR, available from Kodak Polychrome Graphics (Norwalk, Conn.). The surface of the receptor sheet may be smooth or rough. Roughened surfaces may be accomplished by incorporating into the receptor sheet coating inert particles, such as silica or polymeric beads, as described in U.S. Pat. No. 4,876,235 to DeBoer. One or more coatings may be applied to the receptor sheet to facilitate transfer of the infrared radiation sensitive material to the receptor sheet. If a receptor sheet is used to remove the exposed areas of the infrared radiation sensitive material, the receptor sheet should be placed in close proximity to the infrared radiation sensitive material before infrared radiation is projected through the lenticular lens.

Melt-Stick Transfer

In still another embodiment, the exposed areas of the infrared radiation sensitive material are removed through melt-stick transfer. In a melt-stick system, the infrared radiation sensitive material transfers in a molten or semi-molten state from the lenticular lens to a suitable receptor sheet upon exposure to infrared radiation. The molten or semi-molten state is characterized by reduced viscosity, which provides flowability to the infrared radiation sensitive material. The infrared radiation sensitive material flows across to, and adheres to the surface of the receptor sheet with greater strength than it adheres to the lenticular lens. Physical transfer of the infrared radiation sensitive material from the lenticular lens to the receptor sheet in exposed areas thus results. Following transfer, the receptor sheet is separated from the untransferred infrared radiation sensitive material on the lenticular lens.

One or more coatings may be applied to the receptor sheet to facilitate transfer of the infrared radiation sensitive material to the receptor sheet in the melt-stick mechanism. For example, it may be suitable to employ similar or identical binders for both the receptor sheet coating and the binder of the infrared radiation sensitive material. In a particular embodiment, BUTVAR B-76, polyvinyl butyral available from Solutia, Inc. (St. Louis, Mo.), and similar binders are coated on to the receptor sheet before the receptor sheet is placed in contact with the infrared radiation sensitive material.

Further aspects and requirements for melt-stick transfer may be found in U.S. Pat. No. 5,819,661 to Lewis, et al. and in U.S. Pat. No. 5,238,778 to Hirai, et al.

Laser-Induced Film Transfer

In still another embodiment, the exposed areas of the infrared radiation sensitive material are removed from the lenticular lens through laser-induced film transfer ("LIFT"). In a LIFT system, a barrier layer containing a latent crosslinking agent is disposed between the lenticular lens and infrared radiation sensitive material. The crosslinking agent reacts with the binder in the infrared radiation sensitive material to form a high molecular weight network in the exposed areas. The effect of this crosslinking is better control of melt flow phenomena, transfer of more cohesive material to the receptor sheet, and higher quality edge sharpness of the opaque matrix. Examples of this type of system may be found in U.S. Pat. No. 5,935,758 to Patel, et al. which is incorporated herein by reference in its entirety.

In this embodiment, the infrared radiation sensitive material includes a binder including a hydroxylic polymer, a colorant, a fluorocarbon additive, an infrared absorbing dye, and a latent crosslinking agent, which are described above.

Conventional Development

In still another embodiment, the exposed areas of the infrared radiation sensitive material are removed by developing the infrared radiation sensitive material with a suitable developer to form the opaque matrix. In this embodiment, the lenticular lens is washed with a suitable developer to remove the exposed areas of the infrared radiation sensitive material, while unexposed areas remain on the flat surface of the lenticular lens. Exposure of particular infrared radiation sensitive materials causes exposed areas to become more soluble in a suitable developer solution.

Suitable developers for these infrared radiation sensitive materials are aqueous developers having a pH in the range of about 9 to about 14. Conventional developers comprising water, tetra-alkyl ammonium hydroxide, and surfactants, for example, are suitable. Examples of suitable developers include 956 developer (a phenoxyethanol based developer), 955 developer (a benzyl alcohol developer) and Goldstar developer (a sodium metasilicate developer) all available from Kodak Polychrome Graphics (Norwalk, Conn.). Other suitable developers may include PC3000, PC955 and PC9000 also supplied by Kodak Polychrome Graphics.

The developer may be applied to the infrared radiation sensitive material in any suitable manner, including by brushing, wiping, rubbing or spraying. In one embodiment, the infrared radiation sensitive material is developed in a Mercury Mark V Processor, available from Kodak Polychrome Graphics. Development time may range depending on the type of developer and the composition of the infrared radiation sensitive material. Suitable development time may range from 15 seconds to two minutes.

In some embodiments, after development, the opaque matrix may be cured by subjecting the opaque matrix to heat, provided that properties of the opaque matrix are not adversely affected. Heat treatment may be done by a variety of means, such as storage in an oven, hot air treatment, contact with a heated platen or passage through a heated roller device. In other embodiments, heat treatment is not necessary for curing to take place.

Lenticular Lens Sheet

In a another embodiment, the invention is directed to a lenticular lens sheet and an opaque matrix formed on the flat surface of the lenticular lens. In this embodiment, the lenticular lens may be any of the lenticular lenses previously described and the opaque matrix includes any infrared absorbing dye and colorant previously described. The opaque matrix may also include any binder previously described. Any other component described as the infrared radiation sensitive material may be included in the opaque matrix, such as, for example, a fluorosurfactant or a latent crosslinking agent.

In another embodiment, a barrier layer is disposed between the opaque matrix and the flat surface of the lenticular lens. The barrier layer may include any of the materials previously described, such as a binder, a crosslinking agent, and a infrared absorbing dye. The barrier layer may also include a crosslinking agent, as described previously. The opaque matrix may be formed on the flat surface of the lenticular lens using the methods described above.

EXAMPLES

BUTVAR B-76—polyvinyl butyral resin, available from Solutia, Inc. (St. Louis, Mo.)

Carbon Black Millbase—a mixture of 47.52% carbon black, 47.52% BUTVAR B-76, and 4.95% DISPERBYK 161, available from BYK-Chemie USA (Wallingford, Conn.) as a 20% total solids solution in a 50:50 solvent mix of methyl ethyl ketone and Solvent PM Cellulose Nitrate—available from Aldrich Chemical (Milwaukee, Wis.)

D99 IR dye—infrared dye YKR-2900, available from Mitsui, USA (New York, N.Y.)

FC 4432—10% NOVEC Fluorosurfactant, available from 3M (St. Paul, Minn.), in a 4.5:1 solvent mix of methyl ethyl ketone and Solvent PM.

FC 55/35/10—a fluorocarbon surfactant made of a 55:35:10 ratio mixture of a terpolymer of a fluorinated acrylate, a short chain alkyl acrylate, and a polar monomer as a 7.5% total solids solution in methyl ethyl ketone FX-12—N-ethylperflourooctylsulphonamide as a 50% total solids solution in methyl ethyl ketone Glyoxal—available from Aldrich Chemical (Milwaukee, Wis.)

HPA-1186—a dihydropyridine derivative available from St.-Jean Photochemicals, Inc., (Quebec, Canada)

PC 364 IR dye—an infrared dye with the following structure

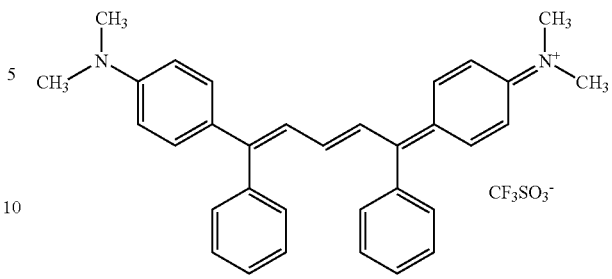

PVA 523—10% Polyvinyl Alcohol 523 in water, available from Air Products (Allentown, Pa.)

Red Shade Yellow Millbase—a mixture of 47.52% Red Shade Yellow pigment, 47.52% BUTVAR B-76, and 4.95% DISPERBYK 161, available from BYK-Chemie (Wallingford, Conn.) as a 15% total solids solution in a 50:50 solvent mix of methyl ethyl ketone and Solvent PM Solvent PM—propylene glycol monomethyl ether, available from Eastman Chemicals, (Kingsport, Tenn.)

TRITON X-100—a surfactant available from Rohm and Haas, (Philadelphia, Pa.) as a 10% total solids solution in water Violet Black Millbase—MICROLITH Violet B-K, available from Ciba Specialty Chemicals (Tarrytown, N.Y.), as a 10% total solids solution in methyl ethyl ketone Example 1

In this example, an opaque matrix was formed using an infrared radiation sensitive material and a barrier layer that contained nitrocellulose and an infrared dye.

A barrier layer solution was prepared by mixing 88.4 wt.-% Cellulose Nitrate, 11.6 wt.-% PC 364 IR dye, and 0.03 wt.-% FC 4432 as a 4.8% total solids solution in a 4.5:1 solvent mix of methyl ethyl ketone and Solvent PM.

A black composition was prepared by mixing the components listed in Table 1 with coating aid FC 55/35/10 to create a 11.5% total solids solution in a 60:20:20 solvent blend of methyl ethyl ketone, Solvent PM, and ethanol alcohol.

To prepare the assembly, the flat surface of a lenticular lens was first coated with the barrier layer solution using a #11 wound wire rod and dried for 5 minutes at 190° F. to form a barrier layer. The lenticular lens contained parallel cylindrical lenticulae with a lens pitch of 0.146 mm. The black composition was then coated on the barrier layer using a #11 wound wire rod. The resulting assembly was dried for 3 minutes at 190° F. The black composition had a transmission optical density of greater than 3.0.

A MATCHPRINT DIGITAL HALFTONE RECEPTOR, available from Kodak Polychrome Graphics (Norwalk, Conn.), was placed in contact with the black composition.

The resulting assembly was mounted on a DESERTCAT 88 imager, available from ECRM (Teweksbury, Mass.) with 16 separate 450 mW laser diodes, emitting a laser with a wavelength of 830 nm. The assembly was exposed to infrared radiation with an exposure energy was 350 mJ/cm$^2$. The focus displacement of the laser was 240 micrometers. Following exposure, the MATCHPRINT DIGITAL HALFTONE RECEPTOR was removed from the lenticular lens to form an opaque matrix.

The opaque matrix had an edge non-linearity of 3% and the resulting apertures exhibited a mean transmittance of 93%.

TABLE 1

Components of Black Composition used in Example 1

| Component | Weight Percent of the Total Solids of the Black Composition |
|---|---|
| Carbon Black Millbase | 57.7% |
| Red Shade Yellow Millbase | 10.3% |
| Violet Black Millbase | 8.0% |
| BUTVAR B-76 | 13.0% |
| D99 IR dye | 5.0% |
| HPA-1186 | 1.6% |
| FX-12 | 4.4% |

Example 2

In this example, an opaque matrix was formed using an infrared radiation sensitive material and a barrier layer that contained a polyvinyl alcohol and a crosslinking agent, but no infrared dye.

A barrier layer solution was prepared by mixing 81.6 wt.-% PVA 523, 18.0 wt.-% Glyoxal, and 0.4 wt.-% TRITON X-100 as a 2.5% total solids solution in a 75:25 solvent mix of water and n-propyl alcohol.

A black composition was prepared by mixing the components listed in Table 2 with coating aid FC 55/35/10 to create a 11.5% total solids solution in a 60:20:20 solvent blend of methyl ethyl ketone, Solvent PM, and ethanol alcohol.

To prepare the assembly, the flat surface of a lenticular lens was first coated with the barrier layer solution using a #11 wound wire rod and dried for 5 minutes at 190° F. to form a barrier layer. The lenticular lens contained parallel cylindrical lenticulae with a lens pitch of 0.146 mm. The black composition was then coated on the barrier layer using a #11 wound wire rod. The resulting assembly was dried for 3 minutes at 190° F. The black composition had a transmission optical density of greater than 3.0.

A MATCHPRINT DIGITAL HALFTONE RECEPTOR, available from Kodak Polychrome Graphics (Norwalk, Conn.), was placed in contact with the black composition.

The resulting assembly was mounted on a DESERTCAT 88 imager, available from ECRM (Teweksbury, Mass.) with 16 separate 450 mW laser diodes, emitting a laser with a wavelength of 830 nm. The assembly was exposed to infrared radiation with an exposure energy was 300 mJ/cm$^2$. The focus offset of the laser was 450 micrometers.

The opaque matrix on the lenticular lens in example 2 exhibited the visibly straight edges and the apertures exhibited a mean transmittance exceeding 90%.

TABLE 2

Components of Black Composition used in Example 2

| Component | Weight Percent of the Total Solids of the Black Composition |
|---|---|
| Carbon Black Millbase | 65.7% |
| Red Shade Yellow Millbase | 10.3% |
| Violet Black Millbase | 8.0% |
| D99 IR dye | 10.0% |
| HPA-1186 | 1.6% |
| FX-12 | 4.4% |

Example 3

In this example, an opaque matrix was formed using an infrared radiation sensitive material and a barrier layer containing nitrocellulose, but no crosslinking agent or infrared dye.

A barrier layer solution was prepared by mixing 99.97 wt.-% Cellulose Nitrate, and 0.03 wt.-% FC 4432 as a 4.8% total solids solution in a 4.5:1 solvent mix of methyl ethyl ketone and Solvent PM.

A black composition was prepared with the components contained in Table 3, in the same manner as the black composition used in Example 1.

To prepare the assembly, the flat surface of a lenticular lens was first coated with the barrier layer solution using a #11 wound wire rod and dried for 5 minutes at 190° F. to form a barrier layer. The lenticular lens had the same properties and dimensions as the lenticular lens used in Example 1. The black composition was then coated on the barrier layer using a #11 wound wire rod. The resulting assembly was dried for 3 minutes at 190° F. The black composition had a transmission optical density of greater than 3.0.

The assembly was then exposed to infrared radiation in the same manner as the assembly in Example 1, using a MATCHPRINT DIGITAL HALFTONE RECEPTOR to collect the ablated black composition.

The opaque matrix exhibited an edge non-linearity of greater than 10% and the apertures exhibited a mean transmittance of less than 60%.

TABLE 3

Components of Black Composition used in Example 3

| Component | Weight Percent of the Total Solids of the Black Composition |
|---|---|
| Carbon Black Millbase | 57.7% |
| Red Shade Yellow Millbase | 10.3% |
| Violet Black Millbase | 8.0% |
| BUTVAR B-76 | 13.0% |
| D99 IR dye | 5.0% |
| HPA-1186 | 1.6% |
| FX-12 | 4.4% |

Example 4 (Comparative)

In this example, an opaque matrix was formed using an opaque material containing no infrared absorbing dye, and a barrier layer containing polyvinyl alcohol with a crosslinking agent.

A barrier layer solution was prepared by mixing 81.6 wt.-% PVA 523, 18.0 wt.-% Glyoxal, and 0.4 wt.-% TRITON X-100 as a 2.5% total solids solution in a 75:25 solvent mix of water and n-propyl alcohol.

A black composition was prepared with the components contained in Table 4, in the same manner as the black composition used in Example 1.

To prepare the assembly, the flat surface of a lenticular lens was first coated with the barrier layer solution using a #11 wound wire rod and dried for 5 minutes at 190° F. The lenticular lens had the same properties and dimensions as the lenticular lens used in Example 1. The black composition was then coated on the barrier layer using a #11 wound wire rod. The resulting assembly was dried for 3 minutes at 190° F. The black composition had a transmission optical density of greater than 3.0.

The assembly was then exposed to infrared radiation in the same manner as the assembly in Example 1, using a MATCHPRINT DIGITAL HALFTONE RECEPTOR to collect the ablated black composition. The resulting apertures exhibited a mean transmittance of less than 50%.

TABLE 4

Components of Black Composition used in Example 4

| Component | Weight Percent of the Total Solids of the Black Composition |
|---|---|
| Carbon Black Millbase | 68.8% |
| Red Shade Yellow Millbase | 12.4% |
| Violet Black Millbase | 9.5% |
| BUTVAR B-76 | 3.5% |
| HPA-1186 | 1.6% |
| FX-12 | 4.4% |

Example 5

In this example, an opaque matrix was formed using an infrared radiation sensitive material and no barrier layer.

A black composition was formed by combining the components of Table 5 with coating aid FC 55/35/10 to create a 11.5% total solids solution in a 60:20:20 solvent blend of methyl ethyl ketone, Solvent PM, and ethanol alcohol. The black composition was coated on the flat surface of a lenticular lens using a #11 wire wound coating rod. The lenticular lens had the same dimensions as the lenticular lens used in Example 1. The black composition was dried for 3 minutes at 190° F. The black composition had a transmission optical density of 3.0.

The resulting assembly was exposed to infrared radiation in the same manner as the apparatus in Example 1, using a MATCHPRINT DIGITAL HALFTONE RECEPTOR to collect the ablated black composition.

The black stripes produced on the lenticular lens in Example 5 exhibited visibly low edge non-linearity and the apertures produced in Example 2 had a mean transmittance of about 90%.

TABLE 5

Components of Black Composition used in Example 5

| Component | Weight Percent of the Total Solids of the Black Composition |
|---|---|
| Carbon Black Millbase | 57.7% |
| Red Shade Yellow Millbase | 10.3% |
| Violet Black Millbase | 8.0% |
| BUTVAR B-76 | 13.0% |
| D99 IR dye | 5.0% |
| HPA-1186 | 1.6% |
| FX-12 | 4.4% |

Example 6 (Comparative)

The opaque matrix in this example was formed using an opaque material that contained nitrocellulose but did not contain an infrared absorbing dye. No barrier layer was used in this example.

A black composition was formed with the components contained in Table 6, in the same manner as the black composition used in Example 5. The black composition was applied to the flat surface of the lenticular lens in the same manner as in Example 5. The lenticular lens had the same properties and dimensions as the lenticular lens used in Example 1. The black composition had a transmission optical density of greater than 3.0.

The assembly was exposed to infrared radiation in the same manner as the assembly in Example 1, using a MATCHPRINT DIGITAL HALFTONE RECEPTOR to collect the ablated black composition.

The opaque matrix produced on the lenticular lens in Example 6 exhibited visibly great edge non-linearity and the apertures exhibited a mean transmittance of about 68%.

TABLE 6

Components of Black Composition used in Example 6

| Component | Weight Percent of the Total Solids of the Black Composition |
|---|---|
| Carbon Black Millbase | 57.7% |
| Red Shade Yellow Millbase | 10.3% |
| Violet Black Millbase | 8.0% |
| Cellulose Nitrate | 20.0% |
| HPA-1186 | 1.6% |
| FX-12 | 4.4% |

Example 7 (Comparative)

The opaque matrix in this example was formed using an opaque material that did not contain either nitrocellulose or an infrared absorbing dye. No barrier layer was used in this example.

A black composition was prepared by combining components of Table 7 in the same manner as the black composition used in Example 5. The black composition was applied to the flat surface of the lenticular lens in the same manner as in Example 5. The lenticular lens had the same properties and dimensions as the lenticular lens used in Example 1. The black composition had a transmission optical density of 3.0.

The assembly was exposed to infrared radiation in the same manner as the assembly in Example 1, using a MATCHPRINT DIGITAL HALFTONE RECEPTOR to collect the ablated black composition.

The opaque matrix produced on the lenticular lens in Example 7 exhibited visibly great edge non-linearity and the apertures exhibited a mean transmittance of less than 50%.

TABLE 7

Components of Black Composition used in Example 7

| Component | Weight Percent of the Total Solids of the Black Composition |
|---|---|
| Carbon Black Millbase | 68.6% |
| Red Shade Yellow Millbase | 12.4% |
| Violet Black Millbase | 9.5% |
| BUTVAR B-76 | 3.5% |
| HPA-1186 | 1.6% |
| FX-12 | 4.4% |

The invention claimed is:
1. A method of forming an opaque matrix on a lenticular lens comprising the steps of:
   (a) applying an infrared radiation sensitive material comprising a colorant and an infrared absorbing dye to the flat surface of the lenticular lens;
   (b) projecting infrared radiation through the lenticular lens onto the infrared radiation sensitive material to cause localized heating in exposed areas of the infrared radiation sensitive material relative to unexposed areas of the infrared radiation sensitive material; and (c) using the localized heating of the exposed areas to enable removal of the exposed areas of the infrared radiation sensitive material from the flat surface of the lenticular lens by ablation.

2. The method of claim 1, further comprising the step of applying a barrier layer to the flat surface of the lenticular lens before step (a).

3. The method of claim 2, wherein the baffler layer comprises an infrared absorbing dye.

4. The method of claim 2, wherein the baffler layer comprises a binder.

5. The method of claim 2, wherein the baffler layer comprises a crossliniking agent.

6. The method of claim 1, wherein the lenticular lens contains parallel cylindrical lenticulae.

7. The method of claim 6, wherein the lens pitch is less than 0.3 mm.

8. The method of claim 6, wherein the opaque matrix is formed in the shape of repeating stripes.

9. The method of claim 1, wherein the lenticular lens contains spherical lenticulae.

10. The method of claim 1, wherein the infrared radiation sensitive material farther comprises a binder.

11. The method of claim 1, wherein the colorant comprises a carbon black pigment.

12. The method of claim 1, wherein the infrared radiation sensitive material comprises a binder, an infrared absorbing dye, and a carbon black pigment.

13. The method of claim 1, wherein the infrared radiation sensitive material farther comprises an ultraviolet absorber.

14. The method of claim 1, wherein the infrared radiation sensitive material further comprises a latent crosslinking agent.

15. The method of claim 1, wherein the infrared radiation sensitive material further comprises a fluorocarbon additive.

16. The method of claim 1, wherein the step of removing the exposed areas of the infrared radiation sensitive material comprises ablation.

17. The method of claim 16, wherein a receptor sheet is placed in close proximity with the infrared radiation sensitive material before infrared radiation is projected through the lenticular lens.

18. The method of claim 1, wherein the opaque matrix has an edge non-linearity of 8% or less.

19. The method of claim 1, wherein the opaque matrix has an edge non-linearity of 5% or less.

20. The method of claim 1, wherein the apertures exhibit a mean transmittance of 85% or more.

21. The method of claim 1, wherein the apertures exhibit a mean transmittance of 90% or more.

22. A method of forming an opaque matrix on the second surface of the lenticular lens, comprising:

(a) applying a baffler layer to the flat surface of the lenticular lens;

(b) applying a uniform coating of an infrared radiation sensitive material to the baffler layer, said coating being substantially continuous and having a fairly uniform thickness;

(c) projecting infrared radiation through the lenticular lens onto the infrared radiation sensitive material to create exposed areas and unexposed areas of the infrared radiation sensitive material; and (d) at least partially removing, by ablation, the exposed areas of the infrared radiation sensitive material film from the barrier layer such that said removal makes the thickness of the infrared sensitive material along the barrier layer non-uniform or makes the coating so that it is no longer substantially continuous.

23. The method of claim 22, wherein the barrier layer comprises a binder, an infrared absorbing dye, and a latent crossliniking agent.

24. A method of forming an opaque matrix on a lenticular lens comprising the steps of:

(a) applying an infrared radiation sensitive material comprising a colorant and an infrared absorbing binder to the flat surface of the lenticular lens, said infrared absorbing binder being of a type that decomposes upon exposure to heat from infrared radiation to rapidly generate a gas; and (b) projecting infrared radiation through the lenticular lens onto the infrared radiation sensitive material to cause localized heating of in exposed areas of the infrared radiation sensitive material relative to unexposed areas of the infrared radiation sensitive material such that said infrared absorbing binder decomposes to rapidly generate a build up of gas under or within the exposed area of the infrared radiation sensitive material to create a pressure that propels the infrared radiation sensitive material off of the lenticular lens in the exposed areas.

* * * * *

UNITED STATES PATENT AND TRADEMARK OFFICE
CERTIFICATE OF CORRECTION

PATENT NO. : 7,317,577 B2  Page 1 of 1
APPLICATION NO. : 10/846906
DATED : January 8, 2008
INVENTOR(S) : Mohammad Z. Ali et al.

It is certified that error appears in the above-identified patent and that said Letters Patent is hereby corrected as shown below:

| | |
|---|---|
| Column 21, Line 10, Claim 3 | In Claim 3, delete "baffler" and insert -- barrier -- |
| Column 21, Line 12, Claim 4 | In Claim 4, delete "baffler" and insert -- barrier -- |
| Column 21, Line 14, Claim 5 | In Claim 5, delete "baffler" and insert -- barrier -- |
| Column 21, Line 15, Claim 5 | In Claim 5, delete "crossliniking" and insert -- crosslinking -- |
| Column 21, Line 25, Claim 10 | In Claim 10, delete "farther" and insert -- further -- |
| Column 21, Line 32, Claim 13 | In Claim 13, delete "farther" and insert -- further -- |
| Column 22, Line 8, Claim 22 | In Claim 22, delete "baffler" and insert -- barrier -- |
| Column 22, Line 11, Claim 22 | In Claim 22, delete "baffler" and insert -- barrier -- |
| Column 22, Line 26, Claim 23 | In Claim 23, delete "crossliniking" and insert -- crosslinking -- |

Signed and Sealed this

Tenth Day of June, 2008

JON W. DUDAS
*Director of the United States Patent and Trademark Office*